(12) United States Patent
Krishnagi et al.

(10) Patent No.: US 11,456,911 B1
(45) Date of Patent: Sep. 27, 2022

(54) SYSTEM AND METHOD FOR IMPLEMENTING A PLATFORM AND LANGUAGE AGNOSTIC SMART RESILIENCY MODULE

(71) Applicant: JPMorgan Chase Bank, N.A., New York, NY (US)

(72) Inventors: Kumar Rao Krishnagi, Powell, OH (US); Matthew J Porter, Mechanicsburg, OH (US); Nalini S Boda, Lewis Center, OH (US); Mark Alan Wells, Dublin, OH (US); Sharmila Prakash, Columbus, OH (US); Vijay Kumar Perla, Westerville, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/446,666

(22) Filed: Sep. 1, 2021

(51) Int. Cl.
| | |
|---|---|
| *H04L 41/06* | (2022.01) |
| *H04L 43/10* | (2022.01) |
| *H04L 43/0805* | (2022.01) |
| *G06F 11/30* | (2006.01) |
| *H04L 67/1029* | (2022.01) |
| *H04L 9/40* | (2022.01) |
| *H04L 67/133* | (2022.01) |

(52) U.S. Cl.
CPC ............ *H04L 41/06* (2013.01); *G06F 11/302* (2013.01); *H04L 43/0805* (2013.01); *H04L 43/10* (2013.01); *H04L 63/0218* (2013.01); *H04L 67/1029* (2013.01); *H04L 67/133* (2022.05)

(58) Field of Classification Search
None
See application file for complete search history.

(56) References Cited

U.S. PATENT DOCUMENTS

| | | | | |
|---|---|---|---|---|
| 7,954,014 | B2 * | 5/2011 | Wang | G06Q 10/06 |
| | | | | 714/47.1 |
| 9,817,739 | B1 * | 11/2017 | Pise | G06F 9/45558 |
| 10,031,815 | B2 * | 7/2018 | Cohen | G06F 11/3079 |
| 10,389,596 | B2 * | 8/2019 | Strobel | H04L 41/12 |
| 10,613,970 | B1 * | 4/2020 | Jammula | G06F 11/3688 |
| 10,924,364 | B2 * | 2/2021 | Floyd | H04L 43/20 |

(Continued)

*Primary Examiner* — Younes Naji
(74) *Attorney, Agent, or Firm* — Greenblum & Bernstein, P.L.C.

(57) ABSTRACT

Various methods, apparatuses/systems, and media for automatically fixing health of a certain component of an application are disclosed. A processor sets a corresponding predetermined threshold value for health of each component of a plurality of components of an application required for running the application; constantly monitors health of the plurality of components. When it is determined, in response to constantly monitoring, that the health of a certain component has reached to a value that is equal to the corresponding predetermined threshold value of the certain component, the processor automatically calls corresponding application programming interface (API) to trigger automated processes that includes collecting all necessary data corresponding to fixing of the health of the certain component related to the application from a plurality of data sources; creating a data file on demand that includes the necessary data; and fixing the health of the certain component based on the data file.

17 Claims, 7 Drawing Sheets

(56) References Cited

U.S. PATENT DOCUMENTS

| | | | |
|---|---|---|---|
| 10,977,108 B2* | 4/2021 | Kondo | G06F 11/0751 |
| 11,281,507 B2* | 3/2022 | Ueno | G06F 9/5005 |
| 11,329,898 B2* | 5/2022 | Guim Bernat | H04L 43/0817 |
| 2005/0055350 A1* | 3/2005 | Werme | G06F 9/54 |
| 2021/0266237 A1* | 8/2021 | Savov | H04L 41/0896 |

* cited by examiner

SYSTEM AND METHOD FOR IMPLEMENTING A PLATFORM AND LANGUAGE AGNOSTIC SMART RESILIENCY MODULE

TECHNICAL FIELD

This disclosure generally relates to application and infrastructure resources, and, more particularly, to methods and apparatuses for implementing a platform and language agnostic smart resiliency module for creating a workflow-based plug and play framework configured for assisting all applications with automatic execution of scripts to aid in failover process.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Applications typically require infrastructure resources such as servers, databases, load balancers, message queues, storages etc. in order to function. Typically, these infrastructure resources need to be provided at the time of application startup. Modern applications may need to access a number of infrastructure resources in order to provide useful functionality. For example, an organization such as JPMorgan and Chase typically runs highly resilient applications. Often, intermittent issues can go undetected leading to dropped transactions. Although conventional monitoring systems may notify the issues, but fail to automatically resolve the issue. For example, application failures due to system faults or application degradation may be detected by monitoring tools but do not have automatic fail-over/self-healing capabilities resulting in customer impacts. Moreover, as per new data center migration rule for resiliency, all failover should be automated. To satisfy this rule, all applications have to create separate scripts for their application, database and storage. However, today's conventional techniques provide no consistency, and every application needs to redo this work costing effort and time.

Thus, there is a need for an advanced workflow smart resiliency tool that can address these conventional shortcomings.

SUMMARY

The present disclosure, through one or more of its various aspects, embodiments, and/or specific features or sub-components, provides, among other features, various systems, servers, devices, methods, media, programs, and platforms for implementing a platform and language agnostic smart resiliency module/tool/framework for creating a workflow-based plug and play framework configured for assisting all applications with automatic execution of scripts to aid in failover process, but the disclosure is not limited thereto.

For example, the various aspects, embodiments, features, and/or sub-components may also provide optimized processes of implementing a platform and language agnostic smart resiliency module/tool/framework that is configured to automatically fail-over applications when a system fault or degradation happens; execute self-healing processes when a monitoring alert is triggered, e.g., automatically deploying applications to a new availability zone, thereby improving applications' performances and reducing customer impact, but the disclosure is not limited thereto.

According to exemplary embodiments, the platform and language agnostic smart resiliency module/tool/framework allows for consistent easy orchestration and passing of data through various components to output a desired result. Since the disclosed process, according to exemplary embodiments, is platform and language agnostic, the smart resiliency module/tool may be independently tuned or modified for optimal performance without affecting the configuration/data files. The configuration/data files, according to exemplary embodiments, may be written using JSON, but the disclosure is not limited thereto. For example, the configuration/data files can easily be extended to other readable file formats such as XML, YAML, etc., or any other configuration based languages.

According to an aspect of the present disclosure, a method for implementing a platform and language agnostic packaging module/tool/framework by utilizing one or more processors and one or more memories is disclosed. The method may include: providing an application having a plurality of components required for running the application; setting a corresponding predetermined threshold value for health of each corresponding component of the plurality of components of the application; constantly monitoring health of the plurality of components; when it is determined, in response to constantly monitoring, that the health of a certain component has reached to a value that is equal to the corresponding predetermined threshold value of the certain component, automatically calling corresponding application programming interface (API) to trigger the following automated processes: collecting all necessary data corresponding to fixing of the health of the certain component related to the application from a plurality of data sources; creating a data file on demand that includes the necessary data; and fixing the health of the certain component based on the data file.

According to yet another aspect of the instant disclosure, the method may further include: creating the data file in any one of the following file formats: .json, .xml, and .yml, but the disclosure is not limited thereto.

According to a further aspect of the instant disclosure, wherein the threshold value indicates that the health of the corresponding component is still within an acceptable range necessary for running the application and that the component's health has not reached to a point to trigger the component's failure, but the disclosure is not limited thereto.

According to an additional aspect of the instant disclosure, wherein, in collecting all necessary data corresponding to the application, the method may further include: calling a private cloud API to access data from the private cloud related to the application; calling a system of record API to access data from the system of record related to the application; calling a load balancer API to access load balancer information data related to the application; and calling a firewall API to access firewall information data related to the application.

According to yet another aspect of the instant disclosure, wherein, in constantly monitoring health of the plurality of components of the application, the method may further include: accessing data from a monitoring platform that allows real-time monitoring of the application; accessing data from a suite of network management tools that allows monitoring of heterogeneous networks corresponding to running of the application; accessing data from one central location hub that aggregates all data feeds with emergency information from various data sources to said one location hub corresponding to running of the application; and accessing data from an event workflow platform related to running of the application.

According to yet another aspect of the instant disclosure, wherein: output data from the monitoring platform is input to the suite of network management tools; output data from the suite of network management tools is input to said one central location hub; output data from said one central location hub is input to the event workflow platform; and output data from the event workflow platform is input to a platform and language agnostic resiliency module that may automatically call the corresponding API to trigger the automated processes of fixing the health of the component.

According to a further aspect of the instant disclosure, wherein, in fixing the health of the certain component based on the data file, the method may further include: inputting data from the data file to an application platform configured for building, testing, maintaining, and operating distributed applications with a blockchain backend; and integrating output data from the application platform to a plurality of private clouds, distributed operating systems, databases, event workflow platform, open source platform configured for allowing users to seamlessly connect, manage and secure networks of different microservices regardless of platform, source or vendor.

According to another aspect of the instant disclosure, a system for automatically fixing health of a certain component of an application is disclosed. The system may include: a processor; and a memory operatively connected to the processor via a communication interface, the memory storing computer readable instructions, when executed, may cause the processor to: set a corresponding predetermined threshold value for health of each corresponding component of a plurality of components of an application required for running the application; constantly monitor health of the plurality of components; when it is determined, in response to constantly monitoring, that the health of a certain component has reached to a value that is equal to the corresponding predetermined threshold value of the certain component, the processor may automatically call corresponding application programming interface (API) to trigger the following automated processes to: collect all necessary data corresponding to fixing of the health of the certain component related to the application from a plurality of data sources; create a data file on demand that includes the necessary data; and fix the health of the certain component based on the data file.

According to yet another aspect of the instant disclosure, the processor may be further configured to create the data file in any one of the following file formats: .json, .xml, and .yml, but the disclosure is not limited thereto.

According to a further aspect of the instant disclosure, wherein, in collecting all necessary data corresponding to the application, the processor may be further configured to: call a private cloud API to access data from the private cloud related to the application; call a system of record API to access data from the system of record related to the application; call a load balancer API to access load balancer information data related to the application; and call a firewall API to access firewall information data related to the application.

According to yet another aspect of the instant disclosure, wherein, in constantly monitoring health of the plurality of components of the application, the processor may be further configured to: access data from a monitoring platform that allows real-time monitoring of the application; access data from a suite of network management tools that allows monitoring of heterogeneous networks corresponding to running of the application; access data from one central location hub that aggregates all data feeds with incident information from various data sources to said one location hub corresponding to running of the application; and access data from an event workflow platform related to running of the application, wherein output data from the monitoring platform is input to the suite of network management tools; output data from the suite of network management tools is input to said one central location hub; output data from said one central location hub is input to the event workflow platform; and output data from the event workflow platform is input to a platform and language agnostic resiliency module that may automatically call the corresponding API to trigger the automated processes of fixing the health of the component.

According to a further aspect of the present disclosure, wherein, in fixing the health of the certain component based on the data file, the processor may be further configured to: input data from the data file to an application platform configured for building, testing, maintaining, and operating distributed applications with a blockchain backend; and integrate output data from the application platform to a plurality of private clouds, distributed operating systems, databases, event workflow platform, open source platform configured for allowing users to seamlessly connect, manage and secure networks of different microservices regardless of platform, source or vendor.

According to yet another aspect of the present disclosure, a non-transitory computer readable medium configured to store instructions for automatically fixing health of a certain component of an application is disclosed. The instructions, when executed, cause a processor to perform the following: setting a corresponding predetermined threshold value for health of each corresponding component of a plurality of components of an application required for running the application; constantly monitoring health of the plurality of components; when it is determined, in response to constantly monitoring, that the health of a certain component has reached to a value that is equal to the corresponding predetermined threshold value of the certain component, wherein, when executed, the instructions further cause the processor to automatically call corresponding application programming interface (API) to trigger the following automated processes: collecting all necessary data corresponding to fixing of the health of the certain component related to the application from a plurality of data sources; creating a data file on demand that includes the necessary data; and fixing the health of the certain component based on the data file.

According to an additional aspect of the instant disclosure, wherein, when executed, the instructions may further cause the processor to perform the following: creating the data file in any one of the following file formats: .json, .xml, and .yml, but the disclosure is not limited thereto.

According to a further aspect of the instant disclosure, wherein, in collecting all necessary data corresponding to the application, the instructions, when executed, may further cause the processor to perform the following: calling a private cloud API to access data from the private cloud related to the application; calling a system of record API to access data from the system of record related to the application; calling a load balancer API to access load balancer information data related to the application; and calling a firewall API to access firewall information data related to the application.

According to yet another aspect of the instant disclosure, wherein, in constantly monitoring health of the plurality of components of the application, the instructions, when executed, may further cause the processor to perform the following: accessing data from a monitoring platform that allows real-time monitoring of the application; accessing data from a suite of network management tools that allows monitoring of heterogeneous networks corresponding to running of the application; accessing data from one central location hub that aggregates all data feeds with emergency information from various data sources to said one location hub corresponding to running of the application; and accessing data from an event workflow platform related to running of the application, wherein: output data from the monitoring platform is input to the suite of network management tools; output data from the suite of network management tools is input to said one central location hub; output data from said one central location hub is input to the event workflow platform; and output data from the event workflow platform is input to a platform and language agnostic resiliency module that automatically calls the corresponding API to trigger the automated processes of fixing the health of the component.

According to yet another aspect of the instant disclosure, wherein, in fixing the health of the certain component based on the data file, the instructions, when executed, further cause the processor to perform the following: inputting data from the data file to an application platform configured for building, testing, maintaining, and operating distributed applications with a blockchain backend; and integrating output data from the application platform to a plurality of private clouds, distributed operating systems, databases, event workflow platform, open source platform configured for allowing users to seamlessly connect, manage and secure networks of different microservices regardless of platform, source or vendor.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
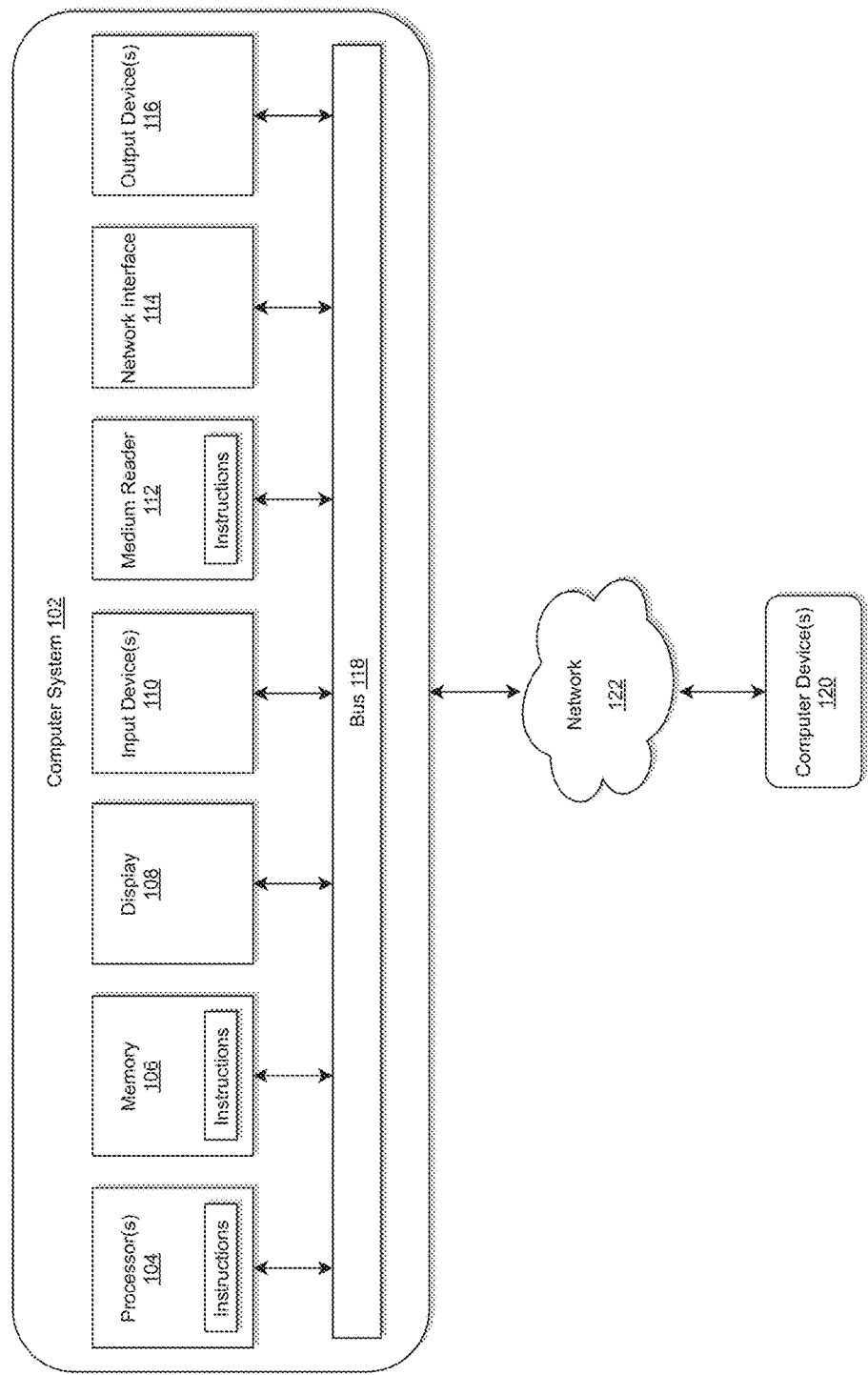
FIG. 1 illustrates a computer system for implementing a platform and language agnostic resiliency module for creating a workflow-based plug and play framework configured for assisting all applications with automatic execution of scripts to aid in failover process in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system for use in implementing a platform and language agnostic resiliency module for creating a workflow-based plug and play framework configured for assisting all applications with automatic execution of scripts to aid in failover process in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
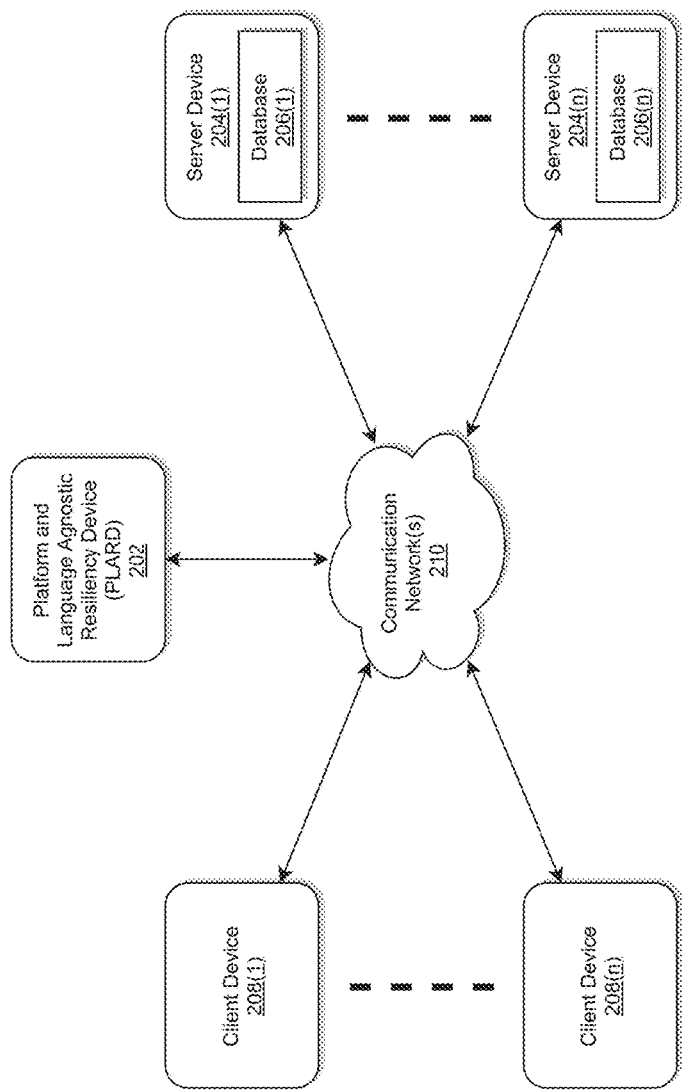
FIG. 2 illustrates an exemplary diagram of a network environment with a platform and language agnostic resiliency device in accordance with an exemplary embodiment.

Referring to FIG. 2, a schematic of an exemplary network environment 200 for implementing a platform and language agnostic resiliency device (PLARD) of the instant disclosure is illustrated.

According to exemplary embodiments, the above-described problems associated with conventional approach of developing, testing, or managing software application may be overcome by implementing a PLARD 202 as illustrated in FIG. 2 that may create a workflow-based plug and play framework configured for assisting all applications with automatic execution of scripts to aid in failover process, but the disclosure is not limited thereto. For example, the PLARD 202 may also provide optimized processes to automatically fail-over applications when a system fault or degradation happens; execute self-healing processes when a monitoring alert is triggered, e.g., automatically deploying applications to a new availability zone, thereby improving applications' performances and reducing customer impact, but the disclosure is not limited thereto.

The PLARD 202 may be the same or similar to the computer system 102 as described with respect to FIG. 1.

The PLARD 202 may store one or more applications that can include executable instructions that, when executed by the PLARD 202, cause the PLARD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the PLARD 202 itself, may be located in virtual server(s) running in a cloud-based computing environment rather than being tied to one or more specific physical network computing devices. Also, the application(s) may be running in one or more virtual machines (VMs) executing on the PLARD 202. Additionally, in one or more embodiments of this technology, virtual machine(s) running on the PLARD 202 may be managed or supervised by a hypervisor.

In the network environment 200 of FIG. 2, the PLARD 202 is coupled to a plurality of server devices 204(1)-204(n) that hosts a plurality of databases 206(1)-206(n), and also to a plurality of client devices 208(1)-208(n) via communication network(s) 210. A communication interface of the PLARD 202, such as the network interface 114 of the computer system 102 of FIG. 1, operatively couples and communicates between the PLARD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the PLARD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The PLARD 202 may be a standalone device or integrated with one or more other devices or apparatuses, such as one or more of the server devices 204(1)-204(n), for example. In one particular example, the PLARD 202 may be hosted by one of the server devices 204(1)-204(n), and other arrangements are also possible. Moreover, one or more of the devices of the PLARD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the PLARD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the PLARD 202 that may efficiently provide a platform for creating a workflow-based plug and play framework configured for assisting all applications with automatic execution of scripts to aid in failover process, but the disclosure is not limited thereto. For example, the client devices 208(1)-208(n) in this example may include any type of computing device that can facilitate the implementation of the PLARD 202 that may be configured to automatically fail-over applications when a system fault or degradation happens; execute self-healing processes when a monitoring alert is triggered, e.g., automatically deploying applications to a new availability zone, thereby improving applications' performances and reducing customer impact, but the disclosure is not limited thereto.

The client devices 208(1)-208(n) may run interface applications, such as standard web browsers or standalone client applications, which may provide an interface to communicate with the PLARD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the PLARD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the PLARD 202, the server devices 204(1)-204(n), or the client devices 208(1)-208(n), for example, may be configured to operate as virtual instances on the same physical machine. For example, one or more of the PLARD 202, the server devices 204(1)-204(n), or the client devices 208(1)-208(n) may operate on the same physical device rather than as separate devices communicating through communication network(s) 210. Additionally, there may be more or fewer PLARDs 202, server devices 204(1)-204(n), or client devices 208(1)-208(n) than illustrated in FIG. 2. According to exemplary embodiments, the PLARD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
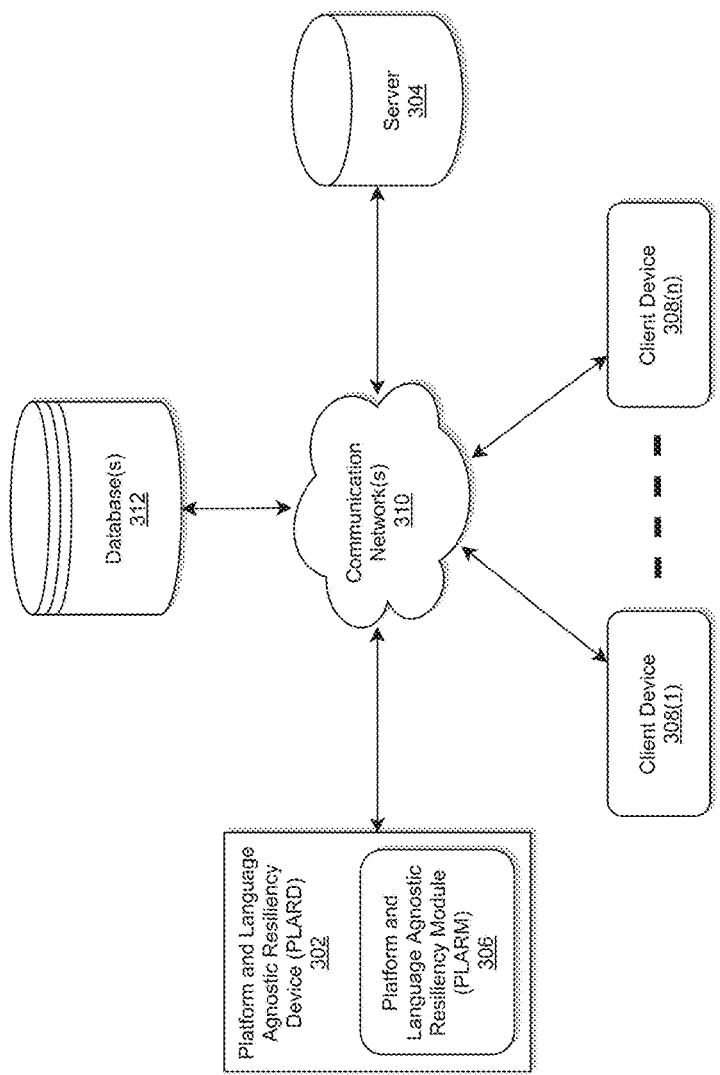
FIG. 3 illustrates a system diagram for implementing a platform and language agnostic resiliency device having a platform and language agnostic resiliency module in accordance with an exemplary embodiment.

FIG. 3 illustrates a system diagram for implementing a platform and language agnostic resiliency device (PLARD) having a platform and language agnostic resiliency module (PLARM) in accordance with an exemplary embodiment.

As illustrated in FIG. 3, the system 300 may include a PLARD 302 within which a PLARM 306 is embedded, a server 304, a database(s) 312, a plurality of client devices 308(1) . . . 308(n), and a communication network 310.

According to exemplary embodiments, the PLARD 302 including the PLARM 306 may be connected to the server 304, and the database(s) 312 via the communication network 310. The PLARD 302 may also be connected to the plurality of client devices 308(1) . . . 308(n) via the communication network 310, but the disclosure is not limited thereto.

According to exemplary embodiment, the PLARD 302 is described and shown in FIG. 3 as including the PLARM 306, although it may include other rules, policies, modules, databases, or applications, for example. According to exemplary embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein.

According to exemplary embodiments, the PLARM 306 may be configured to receive real-time feed of data from the plurality of client devices 308(1) . . . 308(n) via the communication network 310.

As will be described below, the PLARM 306 may be configured to set a corresponding predetermined threshold value for health of each corresponding component of a plurality of components of an application required for running the application in the client device 308(1) . . . 308(n); constantly monitor health of the plurality of components; when it is determined, in response to constantly monitoring, that the health of a certain component has reached to a value that is equal to the corresponding predetermined threshold value of the certain component, the processor may automatically call corresponding application programming interface (API) to trigger the following automated processes to: collect all necessary data corresponding to fixing of the health of the certain component related to the application from a plurality of data sources (e.g., database(s) 312); create a data file on demand that includes the necessary data; and fix the health of the certain component based on the data file, but the disclosure is not limited thereto.

The plurality of client devices 308(1) . . . 308(n) are illustrated as being in communication with the PLARD 302. In this regard, the plurality of client devices 308(1) . . . 308(n) may be "clients" of the PLARD 302 and are described herein as such. Nevertheless, it is to be known and understood that the plurality of client devices 308(1) . . . 308(n) need not necessarily be "clients" of the PLARD 302, or any entity described in association therewith herein. Any additional or alternative relationship may exist between either or both of the plurality of client devices 308(1) . . . 308(n) and the PLARD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the PLARD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The PLARD 302 may be the same or similar to the PLARD 202 as described with respect to FIG. 2, including any features or combination of features described with respect thereto.

Figure 4:
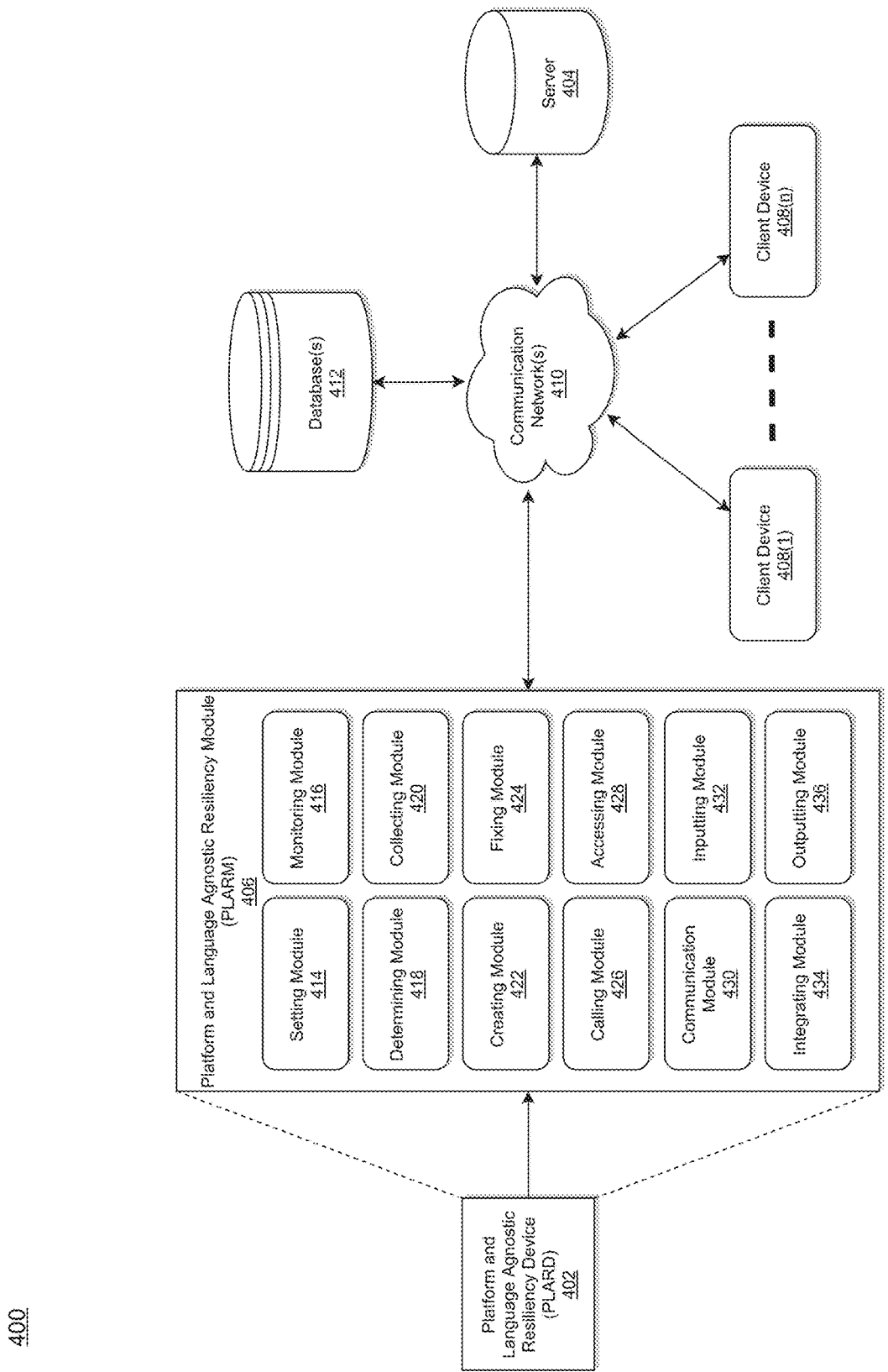
FIG. 4 illustrates a system diagram for implementing a platform and language agnostic resiliency module of FIG. 3 in accordance with an exemplary embodiment.

FIG. 4 illustrates a system diagram for implementing a platform and language agnostic resiliency module (PLARM) of FIG. 3 in accordance with an exemplary embodiment.

According to exemplary embodiments, the system 400 may include a platform and language agnostic resiliency device (PLARD) 402 within which a PLARM 406 is embedded, a server 404, database(s) 412, and a communication network 410.

According to exemplary embodiments, the PLARD 402 including the PLARM 406 may be connected to the server 404 and the database(s) 412 via the communication network 410. The PLARD 402 may also be connected to the plurality of client devices 408(1)-408(n) via the communication network 410, but the disclosure is not limited thereto. The PLARM 406, the server 404, the plurality of client devices 408(1)-408(n), the database(s) 412, the communication network 410 as illustrated in FIG. 4 may be the same or similar to the PLARM 306, the server 304, the plurality of client devices 308(1)-308(n), the database(s) 312, the communication network 310, respectively, as illustrated in FIG. 3.

According to exemplary embodiments, as illustrated in FIG. 4, the PLARM 406 may include a setting module 414, a monitoring module 416, a determining module 418, a collecting module 420, a creating module 422, a fixing module 424, a calling module 426, an accessing module 428, a communication module 430, an inputting module 432, an integrating module 434, and an outputting module 436.

According to exemplary embodiments, each of the setting module 414, monitoring module 416, determining module 418, collecting module 420, creating module 422, fixing module 424, calling module 426, accessing module 428, communication module 430, inputting module 432, integrating module 434, and the outputting module 436 of the PLARM 406 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the setting module 414, monitoring module 416, determining module 418, collecting module 420, creating module 422, fixing module 424, calling module 426, accessing module 428, communication module 430, inputting module 432, integrating module 434, and the outputting module 436 of the PLARM 406 may be implemented by microprocessors or similar, and may be programmed using software (e.g., microcode) to perform various functions discussed herein and may optionally be driven by firmware and/or software.

Alternatively, according to exemplary embodiments, each of the setting module 414, monitoring module 416, determining module 418, collecting module 420, creating module 422, fixing module 424, calling module 426, accessing module 428, communication module 430, inputting module 432, integrating module 434, and the outputting module 436 of the PLARM 406 may be implemented by dedicated hardware, or as a combination of dedicated hardware to perform some functions and a processor (e.g., one or more programmed microprocessors and associated circuitry) to perform other functions.

According to exemplary embodiments, each of the setting module 414, monitoring module 416, determining module 418, collecting module 420, creating module 422, fixing module 424, calling module 426, accessing module 428, communication module 430, inputting module 432, integrating module 434, and the outputting module 436 of the PLARM 406 may be called via corresponding API.

Figure 5:
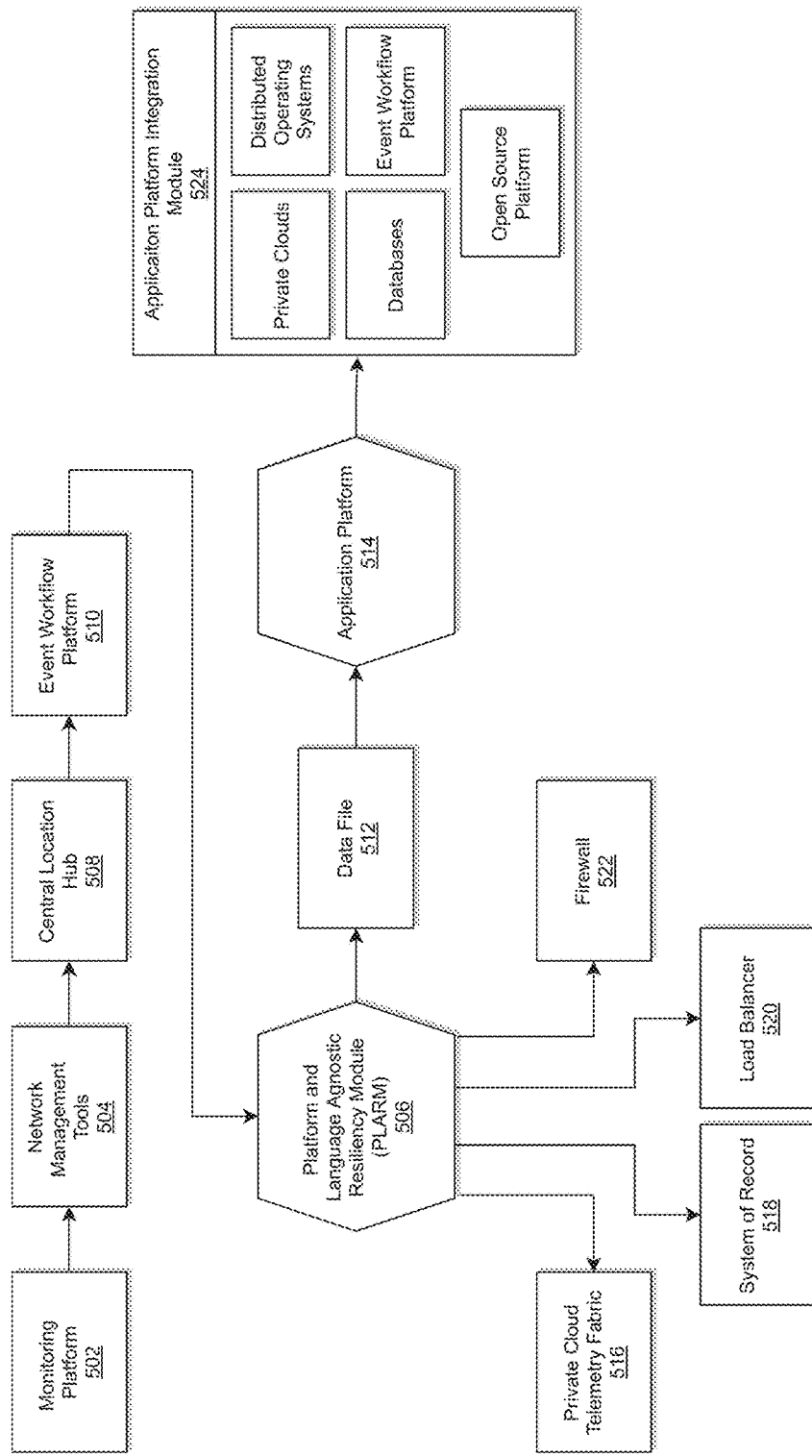
FIG. 5 illustrates an exemplary smart resiliency architecture implemented by the platform and language agnostic resiliency module of FIG. 4 in accordance with an exemplary embodiment.

FIG. 5 illustrates an exemplary smart resiliency architecture 500 implemented by the PLARM 406 of FIG. 4 in accordance with an exemplary embodiment.

As illustrated in FIG. 5, according to an exemplary use case, the exemplary smart resiliency architecture 500 may include a monitoring platform 502 (e.g., Dynatrace, but the disclosure is not limited thereto) operatively connected to network management tools 504 (e.g., Netcool, but the disclosure is not limited thereto). The network management tools 504 may be operatively connected to a central location hub 508 which may be operatively connected to an event workflow platform 510, but the disclosure is not limited thereto.

According to exemplary embodiments, the internal architecture of the PLARM 506 may be the same or similar to the internal architecture of the PLARM 406 as illustrated in FIG. 4.

FIG. 5 also illustrates a PLARM 506 that may be operatively connected to the monitoring platform 502, network management tools 504, the central location hub 508, the event workflow platform 510, a private cloud telemetry fabric 516, system of record 518, a load balancer 520, a firewall 522, a data file 512, an application platform 514, and an application platform integration module 524.

The process may be executed via the communication module 430 and the communication network 410, which may comprise plural networks as described above. For example, in an exemplary embodiment, the various components of the PLARM 406, 506 may communicate with the server 404, and the database(s) 412 via the communication module 430 and the communication network 410. Of course, these embodiments are merely exemplary and are not limiting or exhaustive.

According to exemplary embodiments, the communication network 410 and the communication module 430 may be configured to establish a link between the database(s) 412, the client devices 408(1)-408(n) and the PLARM 406, 506.

Referring to FIGS. 4 and 5, the setting module 414 may be configured to set a corresponding predetermined threshold value for health of each corresponding component of a plurality of components of an application required for running the application. According to exemplary embodiments, the monitoring module 416 may be configured to constantly monitor health of the plurality of components. When the determining module 418 determines, in response to constantly monitoring, that the health of a certain component has reached to a value that is equal to the corresponding predetermined threshold value of the certain component, the calling module 426 may automatically call corresponding application programming interface (API) to trigger the following automated processes to: collect all necessary data corresponding to fixing of the health of the certain component related to the application from a plurality of data sources by utilizing the collecting module 420; create a data file on demand that includes the necessary data by utilizing the creating module 422; and fix the health of the certain component based on the data file by utilizing fixing module 424.

For example, an exemplary use case scenario for health of a component may include memory capacity. For example, an application's memory utilization beyond 85% may cause the application to crash, impacting users. Thus, the setting module 414 may set a predetermined threshold value to be at 80% memory capacity to trigger an alert. For example, the monitoring module 416 implemented within the monitoring platform 502 may constantly monitor the application's memory capacity when running. Whenever the application's memory capacity reaches to 80%, the PLARM 406/506 may implement an alert through the monitoring platform (e.g., Dynatrace) and may automatically call corresponding application programming interface (API) to trigger the following automated processes to: collect all necessary data corresponding to fixing of memory capacity of the certain component related to the application from a plurality of data sources by utilizing the collecting module 420; create a data file 512 on demand that includes the necessary data by utilizing the creating module 422; and fix the health of the certain component based on the data file 512 by utilizing fixing module 424.

However, the disclosure is not limited to the memory capacity scenario use case example as disclosed above. The PLARM 406/506 may be configured to handle any system/application faults regardless of platform or language without departing from the scope of the present disclosure.

According to exemplary embodiments, the creating module 422 may be configured to create the data file in any one of the following file formats: .json, .xml, and .yml, but the disclosure is not limited thereto.

According to exemplary embodiments, in collecting all necessary data corresponding to the application, the calling module 426 of the PLARM 406, 506 may be configured to: call a private cloud API to access data from the private cloud telemetry fabric 516 related to the application; call a system of record API to access data from the system of record 518 related to the application; call a load balancer API to access load balancer information data from the load balancer 520 related to the application; and call a firewall API to access firewall information data from the firewall 522 related to the application.

According to exemplary embodiments, in constantly monitoring health of the plurality of components of the application, the accessing module 428 of the PLARM 406, 506 may be further configured to: access data from the monitoring platform 502 that allows real-time monitoring of the application; access data from the suite of network management tools 504 that allows monitoring of heterogeneous networks corresponding to running of the application; access data from the central location hub 508 that aggregates all data feeds with emergency information from various data sources to the central location hub 508 corresponding to running of the application; and access data from an event workflow platform 510 related to running of the application.

According to exemplary embodiments, the output data from the monitoring platform 502 may be input to the suite of network management tools 504. The output data from the suite of network management tools 504 may be input to the central location hub 508. The output data from the central location hub 508 may be input to the event workflow platform 510, and the output data from the event workflow platform 510 may be input to PLARM 506 that may automatically call the corresponding API to trigger the automated processes of fixing the health of the component disclosed above.

According to exemplary embodiments, in fixing the health of the certain component based on the data file 512, the inputting module 432 may be configured to input data from the data file 512 created on demand to the application platform 514 configured for building, testing, maintaining, and operating distributed applications with a blockchain backend. The integrating module 434 may be configured to integrate output data from the application platform 514 to the application platform integration module 524 that may include a plurality of private clouds, distributed operating systems, databases, event workflow platform, open source platform, etc., configured for allowing users to seamlessly connect, manage and secure networks of different microservices regardless of platform, source or vendor, but the disclosure is not limited thereto.

Figure 6:
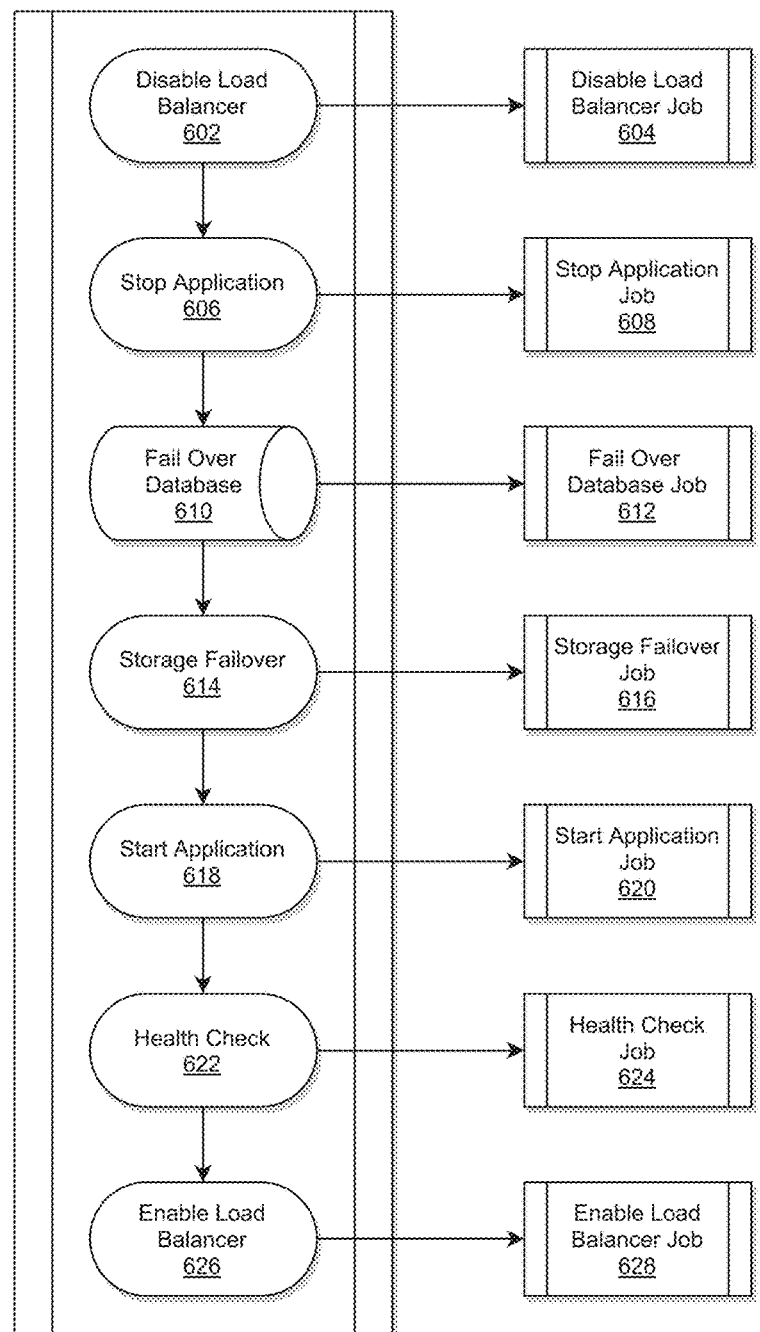
FIG. 6 illustrates another exemplary smart resiliency architecture implemented by the platform and language agnostic resiliency module of FIG. 4 in accordance with an exemplary embodiment.

FIG. 6 illustrates another exemplary smart resiliency architecture implemented by the PLARM 406, 506 which illustrates a process 600 that automatically fixes certain issues associated with an application in accordance with an exemplary embodiment.

For example, as illustrated in FIG. 6, upon detection of a certain issue associated with an application, the PLARM 406, 506 may disable the load balancer at step 602 which executes a process to disable load balancer job 604. At step 606, the PLARM 406, 506 may stop the application which executes a process to stop application job 608. At step 610, the PLARM 406, 506 may failover database which executes a process to failover database job 612. At step 614, the PLARM 406, 506 may failover storage which executes a process to failover storage job 616. At step 618, the PLARM 406, 506 may start the application which executes a process to start application job 620. At step 622, the PLARM 406, 506 may perform health check for the application which executes a process to health check job 624. At step 626, the PLARM 406, 506 may enable the load balancer which executes a process to enable load balancer job 628, thereby automatically resolving the issue.

Figure 7:
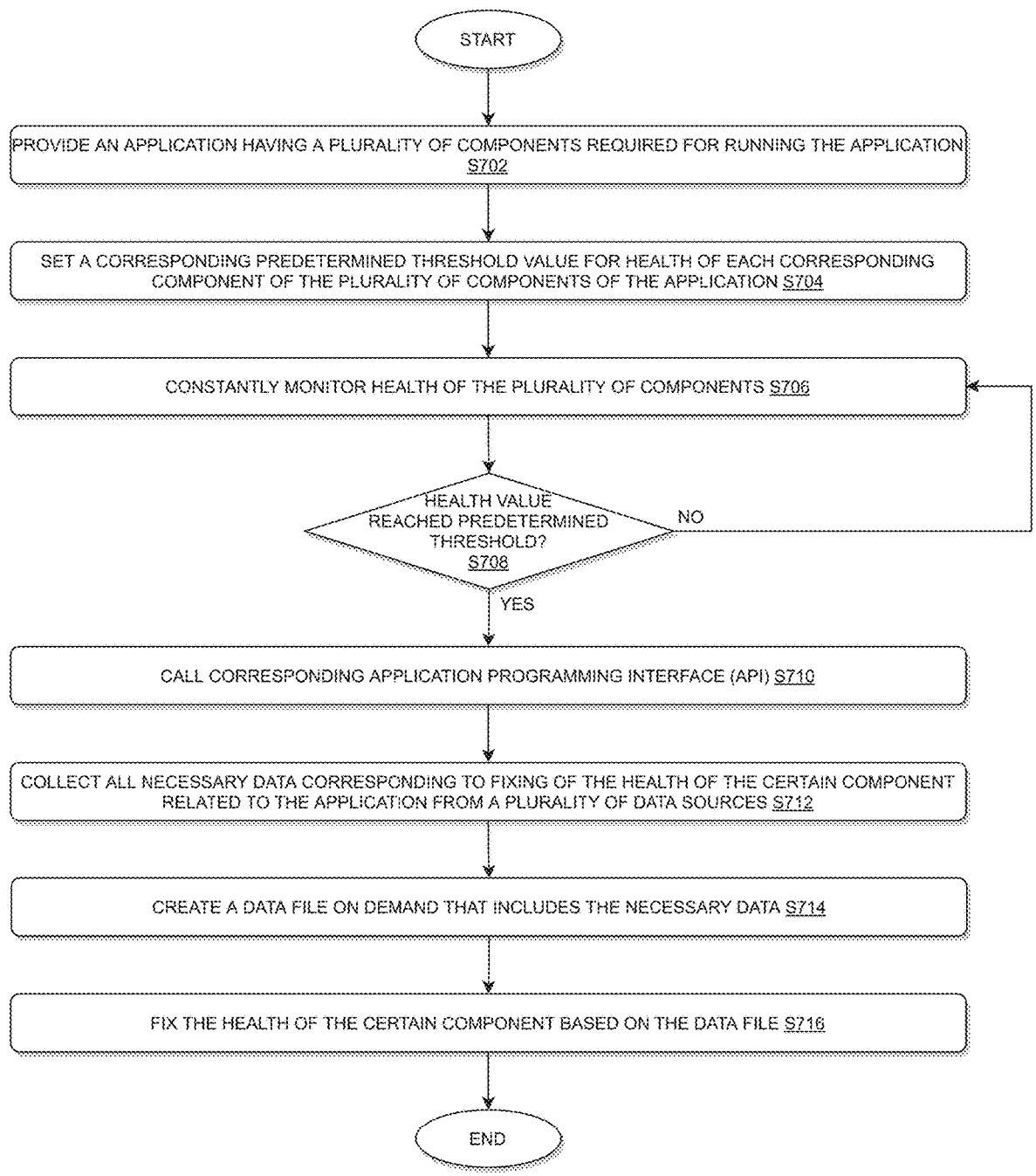
FIG. 7 illustrates a flow chart for implementing a language agnostic packaging module that provides a platform for creating a workflow-based plug and play framework configured for assisting all applications with automatic execution of scripts to aid in failover process in accordance with an exemplary embodiment.

FIG. 7 illustrates a flow chart of a process 700 for implementing the PLARM 406, 506 that provides a platform for creating a workflow-based plug and play framework configured for assisting all applications with automatic execution of scripts to aid in failover process in accordance with an exemplary embodiment. It will be appreciated that the illustrated process 700 and associated steps may be performed in a different order, with illustrated steps omitted, with additional steps added, or with a combination of reordered, combined, omitted, or additional steps.

As illustrated in FIG. 7, at step S702, the process 700 may include providing an application having a plurality of components required for running the application.

At step S704, the process 700 may include setting a corresponding predetermined threshold value for health of each corresponding component of the plurality of components of the application. The threshold value may indicate that the health of the corresponding component is still within an acceptable range necessary for running the application and that the component's health has not reached to a point to trigger the component's failure.

At step S706, the process 700 may include constantly monitoring health of the plurality of components.

At step S708, the process 700 may include determining whether the health of a certain component has reached to a value that is equal to the corresponding predetermined threshold value of the certain component.

When at step S708 the process 700 determines that the health of a certain component has reached to a value that is equal to the corresponding predetermined threshold value of the certain component, at step S710, the process 700 may include calling corresponding application programming interface (API) to trigger the following automated processes that includes steps S712, S714, and S716. And when at step S708 the process 700 determines that the health of a certain component has not reached to a value that is equal to the corresponding predetermined threshold value of the certain component, the process 700 may go back to step S706 to continue monitoring health of the plurality of components of the application.

At step S712, the process may include collecting all necessary data corresponding to fixing of the health of the certain component related to the application from a plurality of data sources.

At step S714, the process 700 may include creating a data file on demand that includes the necessary data.

At step S716, the process 700 may include fixing the health of the certain component based on the data file.

According to exemplary embodiments, the process 700 may further include creating the data file in any one of the following file formats: son, .xml, and .yml, but the disclosure is not limited thereto.

According to exemplary embodiments, in collecting all necessary data corresponding to the application, the process 700 may further include: calling a private cloud API to access data from the private cloud related to the application; calling a system of record API to access data from the system of record related to the application; calling a load balancer API to access load balancer information data related to the application; and calling a firewall API to access firewall information data related to the application.

According to exemplary embodiments, in constantly monitoring health of the plurality of components of the application, the process 700 may further include: accessing data from a monitoring platform that allows real-time monitoring of the application; accessing data from a suite of network management tools that allows monitoring of heterogeneous networks corresponding to running of the application; accessing data from one central location hub that aggregates all data feeds with emergency information from various data sources to said one location hub corresponding to running of the application; and accessing data from an event workflow platform related to running of the application.

According to exemplary embodiments, in the process 700, output data from the monitoring platform is input to the suite of network management tools; output data from the suite of network management tools is input to said one central location hub; output data from said one central location hub is input to the event workflow platform; and output data from the event workflow platform is input to a platform and language agnostic resiliency module that may automatically call the corresponding API to trigger the automated processes of fixing the health of the component.

According to exemplary embodiments, in fixing the health of the certain component based on the data file, the process 700 may further include: inputting data from the data file to an application platform configured for building, testing, maintaining, and operating distributed applications with a blockchain backend; and integrating output data from the application platform to a plurality of private clouds, distributed operating systems, databases, event workflow platform, open source platform configured for allowing users to seamlessly connect, manage and secure networks of different microservices regardless of platform, source or vendor.

According to exemplary embodiments, the PLARD 402 may include a memory (e.g., a memory 106 as illustrated in FIG. 1) which may be a non-transitory computer readable medium that may be configured to store instructions for implementing a PLARM 406, 506 for creating a workflow-based plug and play framework configured for assisting all applications with automatic execution of scripts to aid in failover process as disclosed herein. The PLARD 402 may also include a medium reader (e.g., a medium reader 112 as illustrated in FIG. 1) which may be configured to read any one or more sets of instructions, e.g., software, from any of the memories described herein. The instructions, when executed by a processor embedded within the PLARM 406, 506 or within the PLARD 402, may be used to perform one or more of the methods and processes as described herein. In a particular embodiment, the instructions may reside completely, or at least partially, within the memory 106, the medium reader 112, and/or the processor 104 (see FIG. 1) during execution by the PLARD 402.

According to exemplary embodiments, the instructions, when executed, may cause a processor embedded within the PLARM 406, 506 or the PLARD 402 to perform the following: setting a corresponding predetermined threshold value for health of each corresponding component of a plurality of components of an application required for running the application; constantly monitoring health of the plurality of components; when it is determined, in response to constantly monitoring, that the health of a certain component has reached to a value that is equal to the corresponding predetermined threshold value of the certain component, wherein, when executed, the instructions further cause the processor to automatically call corresponding application programming interface (API) to trigger the following automated processes: collecting all necessary data corresponding to fixing of the health of the certain component related to the application from a plurality of data sources; creating a data file on demand that includes the necessary data; and fixing the health of the certain component based on the data file. The processor may be the same or similar to the processor 104 as illustrated in FIG. 1 or the processor embedded within PLARD 202, PLARD 302, PLARD 402, and PLARM 406, 506.

According to exemplary embodiments, the instructions, when executed, may further cause the processor 104 to perform the following: creating the data file in any one of the following file formats: son, .xml, and .yml, but the disclosure is not limited thereto.

According to exemplary embodiments, in collecting all necessary data corresponding to the application, the instructions, when executed, may further cause the processor 104 to perform the following: calling a private cloud API to access data from the private cloud related to the application; calling a system of record API to access data from the system of record related to the application; calling a load balancer API to access load balancer information data related to the application; and calling a firewall API to access firewall information data related to the application.

According to exemplary embodiments, in constantly monitoring health of the plurality of components of the application, the instructions, when executed, may further cause the processor 104 to perform the following: accessing data from a monitoring platform that allows real-time monitoring of the application; accessing data from a suite of network management tools that allows monitoring of heterogeneous networks corresponding to running of the application; accessing data from one central location hub that aggregates all data feeds with emergency information from various data sources to said one location hub corresponding to running of the application; and accessing data from an event workflow platform related to running of the application, wherein: output data from the monitoring platform is input to the suite of network management tools; output data from the suite of network management tools is input to said one central location hub; output data from said one central location hub is input to the event workflow platform; and output data from the event workflow platform is input to a platform and language agnostic resiliency module that automatically calls the corresponding API to trigger the automated processes of fixing the health of the component.

According to exemplary embodiments, in fixing the health of the certain component based on the data file, the instructions, when executed, further cause the processor 104 to perform the following: inputting data from the data file to an application platform configured for building, testing, maintaining, and operating distributed applications with a blockchain backend; and integrating output data from the application platform to a plurality of private clouds, distributed operating systems, databases, event workflow platform, open source platform configured for allowing users to seamlessly connect, manage and secure networks of different microservices regardless of platform, source or vendor.

According to exemplary embodiments as disclosed above in FIGS. 1-7, technical improvements effected by the instant disclosure may include a platform for implementing a platform and language agnostic smart resiliency module/tool/framework for creating a workflow-based plug and play framework configured for assisting all applications with automatic execution of scripts to aid in failover process, but the disclosure is not limited thereto.

For example, according to exemplary embodiments as disclosed above in FIGS. 1-7, technical improvements effected by the instant disclosure may include a platform that may also provide optimized processes of implementing a platform and language agnostic smart resiliency module/tool/framework that is configured to automatically fail-over applications when a system fault or degradation happens; execute self-healing processes when a monitoring alert is triggered, e.g., automatically deploying applications to a new availability zone, thereby improving applications' performances and reducing customer impact, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for automatically fixing health of a certain component of an application by utilizing one or more processors and one or more memories, the method comprising:

providing the application having a plurality of components required for running the application;

setting a corresponding predetermined threshold value for health of each corresponding component of the plurality of components of the application;

constantly monitoring health of the plurality of components;

when it is determined, in response to constantly monitoring, that the health of the certain component has reached to a value that is equal to the corresponding predetermined threshold value of the certain component, automatically calling corresponding application programming interface (API) to trigger the following automated processes:

collecting all necessary data corresponding to fixing of the health of the certain component related to the application from a plurality of data sources, wherein, in collecting all necessary data corresponding to the application, the method further comprising:

calling a private cloud API to access data from the private cloud related to the application;

calling a system of record API to access data from the system of record related to the application;

calling a load balancer API to access load balancer information data related to the application; and calling a firewall API to access firewall information data related to the application;

creating a data file on demand that includes the necessary data; and fixing the health of the certain component based on the data file.

2. The method according to claim 1, further comprising:

creating the data file in any one of the following file formats: json, xml, and .yml.

3. The method according to claim 1, wherein the threshold value indicates that the health of a corresponding component is still within an acceptable range necessary for running the application and that the corresponding component's health has not reached to a point to trigger the corresponding component's failure.

4. The method according to claim 1, wherein, in constantly monitoring health of the plurality of components of the application, the method further comprising:

accessing data from a monitoring platform that allows real-time monitoring of the application;

accessing data from a suite of network management tools that allows monitoring of heterogeneous networks corresponding to running of the application;
accessing data from one central location hub that aggregates all data feeds with emergency information from various data sources to said one location hub corresponding to running of the application; and
accessing data from an event workflow platform related to running of the application.

5. The method according to claim 4, wherein:
output data from the monitoring platform is input to the suite of network management tools;
output data from the suite of network management tools is input to said one central location hub;
output data from said one central location hub is input to the event workflow platform; and
output data from the event workflow platform is input to a platform and language agnostic resiliency module that automatically calls the corresponding API to trigger the automated processes of fixing the health of the certain component.

6. The method according to claim 1, wherein, in fixing the health of the certain component based on the data file, the method further comprising:
inputting data from the data file to an application platform configured for building, testing, maintaining, and operating distributed applications with a blockchain backend; and
integrating output data from the application platform to a plurality of private clouds, distributed operating systems, databases, event workflow platform, open source platform configured for allowing users to seamlessly connect, manage and secure networks of different microservices regardless of platform, source or vendor.

7. A system for automatically fixing health of a certain component of an application, the system comprising:
a processor; and
a memory operatively connected to the processor via a communication interface, the memory storing computer readable instructions, when executed, causes the processor to:
set a corresponding predetermined threshold value for health of each corresponding component of a plurality of components of the application required for running the application;
constantly monitor health of the plurality of components;
when it is determined, in response to constantly monitoring, that the health of the certain component has reached to a value that is equal to the corresponding predetermined threshold value of the certain component, the processor automatically calls corresponding application programming interface (API) to trigger the following automated processes to:
collect all necessary data corresponding to fixing of the health of the certain component related to the application from a plurality of data sources, wherein, in collecting all necessary data corresponding to the application, the processor is further configured to:
call a private cloud API to access data from the private cloud related to the application;
call a system of record API to access data from the system of record related to the application;
call a load balancer API to access load balancer information data related to the application; and
call a firewall API to access firewall information data related to the application;
create a data file on demand that includes the necessary data; and
fix the health of the certain component based on the data file.

8. The system according to claim 7, wherein the processor is further configured to:
create the data file in any one of the following file formats: json, xml, and -yml.

9. The system according to claim 7, wherein the threshold value indicates that the health of a corresponding component is still within an acceptable range necessary for running the application and that the corresponding component's health has not reached to a point to trigger the corresponding component's failure.

10. The system according to claim 7, wherein, in constantly monitoring health of the plurality of components of the application, the processor is further configured to:
access data from a monitoring platform that allows real-time monitoring of the application;
access data from a suite of network management tools that allows monitoring of heterogeneous networks corresponding to running of the application;
access data from one central location hub that aggregates all data feeds with emergency information from various data sources to said one location hub corresponding to running of the application; and
access data from an event workflow platform related to running of the application.

11. The system according to claim 10, wherein:
output data from the monitoring platform is input to the suite of network management tools;
output data from the suite of network management tools is input to said one central location hub;
output data from said one central location hub is input to the event workflow platform; and
output data from the event workflow platform is input to a platform and language agnostic resiliency module that automatically calls the corresponding API to trigger the automated processes of fixing the health of the certain component.

12. The system according to claim 7, wherein, in fixing the health of the certain component based on the data file, the processor is further configured to:
input data from the data file to an application platform configured for building, testing, maintaining, and operating distributed applications with a blockchain backend; and
integrate output data from the application platform to a plurality of private clouds, distributed operating systems, databases, event workflow platform, open source platform configured for allowing users to seamlessly connect, manage and secure networks of different microservices regardless of platform, source or vendor.

13. A non-transitory computer readable medium configured to store instructions for automatically fixing health of a certain component of an application, wherein, when executed, the instructions cause a processor to perform the following:
setting a corresponding predetermined threshold value for health of each corresponding component of a plurality of components of the application required for running the application;
constantly monitoring health of the plurality of components;
when it is determined, in response to constantly monitoring, that the health of the certain component has reached to a value that is equal to the corresponding predetermined threshold value of the certain component, wherein, when executed, the instructions further cause the processor to automatically call corresponding application programming interface (APJ) to trigger the following automated processes:
collecting all necessary data corresponding to fixing of the health of the certain component related to the application from a plurality of data sources, wherein, in collecting all necessary data corresponding to the application, the instructions, when executed, further cause the processor to perform the following:
 calling a private cloud API to access data from the private cloud related to the application;
 calling a system of record API to access data from the system of record related to the application;
 calling a load balancer API to access load balancer information data related to the application; and
 calling a firewall API to access firewall information data related to the application;
creating a data file on demand that includes the necessary data; and
fixing the health of the certain component based on the data file.

14. The non-transitory computer readable medium according to claim 13, wherein, when executed, the instructions further cause the processor to perform the following:
 creating the data file in any one of the following file formats: json, .xml, and .yml;
and wherein the threshold value indicates that the health of a corresponding component is still within an acceptable range necessary for running the application and that the corresponding component's health has not reached to a point to trigger the corresponding component's failure.

15. The non-transitory computer readable medium according to claim 13, wherein, in constantly monitoring health of the plurality of components of the application, the instructions, when executed, further cause the processor to perform the following:
 accessing data from a monitoring platform that allows real-time monitoring of the application;
 accessing data from a suite of network management tools that allows monitoring of heterogeneous networks corresponding to running of the application;
 accessing data from one central location hub that aggregates all data feeds with emergency information from various data sources to said one location hub corresponding to running of the application; and
 accessing data from an event workflow platform related to running of the application.

16. The non-transitory computer readable medium according to claim 15, wherein:
 output data from the monitoring platform is input to the suite of network management tools;
 output data from the suite of network management tools is input to said one central location hub;
 output data from said one central location hub is input to the event workflow platform; and
 output data from the event workflow platform is input to a platform and language agnostic resiliency module that automatically calls the corresponding API to trigger the automated processes of fixing the health of the certain component.

17. The non-transitory computer readable medium according to claim 13, wherein, in fixing the health of the certain component based on the data file, the instructions, when executed, further cause the processor to perform the following:
 inputting data from the data file to an application platform configured for building,
 testing, maintaining, and operating distributed applications with a blockchain backend; and
 integrating output data from the application platform to a plurality of private clouds, distributed operating systems, databases, event workflow platform, open source platform configured for allowing users to seamlessly connect, manage and secure networks of different microservices regardless of platform, source or vendor.

* * * * *